July 19, 1966
M. C. K. DE PORAY
3,261,120
UNIT AND APPARATUS FOR FILMING A PICTURE WHICH HAS
A SURFACE INCLUDING PROJECTIONS AND GIVES AN
ILLUSION OF MOVEMENT WHEN ILLUMINATED
BY A MOVING LIGHT SOURCE
Filed Jan. 23, 1964
2 Sheets-Sheet 1
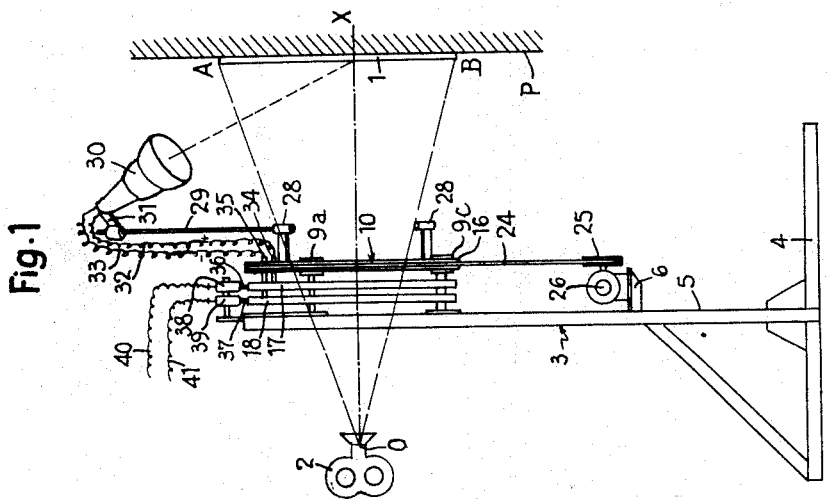
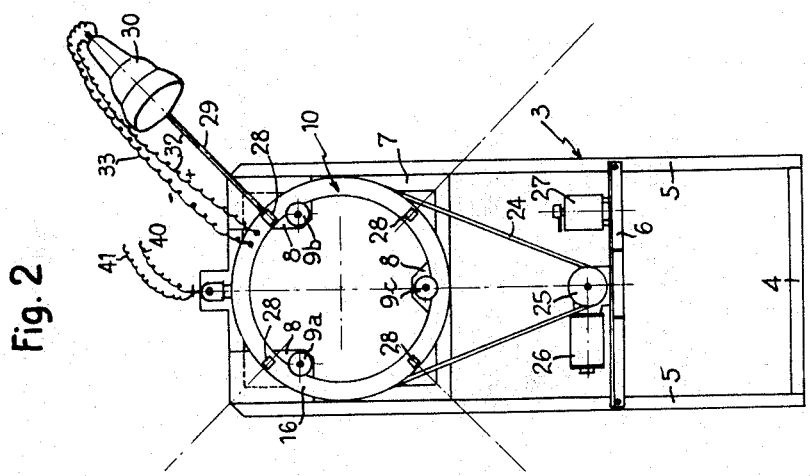
MARCEL CYPRIEN KUCZEWSKI DE PORAY
by: E. M. Squire
his attorney

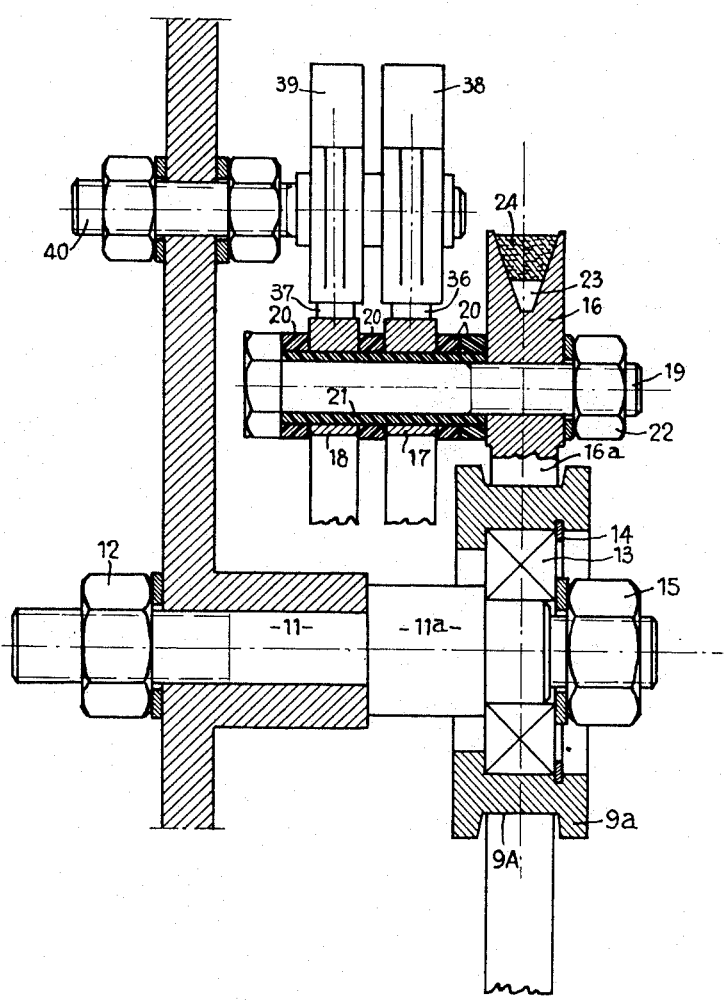

United States Patent Office 3,261,120
Patented July 19, 1966

3,261,120
UNIT AND APPARATUS FOR FILMING A PICTURE WHICH HAS A SURFACE INCLUDING PROJECTIONS AND GIVES AN ILLUSION OF MOVEMENT WHEN ILLUMINATED BY A MOVING LIGHT SOURCE
Marcel Cyprien Kuczewski de Poray, 74 Rue Saint-Lazare, Paris, France
Filed Jan. 23, 1964, Ser. No. 339,774
Claims priority, application France, Feb. 4, 1963, 923,615
9 Claims. (Cl. 40—106.52)

The present invention relates in a general way to a process described in particular in the U.S. Patent No. 2,560,392 which gives the observer who observes a picture, for example representing the drawing of an apparatus or a photographic image, the impression that at least some of the parts of this picture undergo movements corresponding to those that the elements they represent should in fact undergo.

The expression "picture" employed hereinafter denotes pictures having engraved faces for the aforementioned process.

It has been discovered that it was possible to film said pictures when suitably illuminated by a rotating source of light, this filming being effected by means of a conventional camera.

The object of the present invention is to provide a unit which permits suitably effecting this filming and in particular to provide a lighting suitable for said picture, namely a lighting which permits obtaining cinematographic images of good quality by means of a conventional camera and conventional photosensitive emulsions.

The unit according to the invention comprises in combination, a camera adapted to be disposed in front of the picture to be filmed and so directed that its optical axis is perpendicular to the plane of the picture, an illuminating device for illuminating the picture disposed between the picture and the camera, said device comprising sources of light evenly spaced apart in the same plane about a geometric axis which is fixed relative to the stand of the device, said geometric axis coinciding with said optical axis in the filming position, said light sources being located outside the filming zone and mounted on a common support adapted to be driven in rotation relative to the fixed support of the device about said geometric axis.

Said illuminating device, also provided by the invention, comprises a stand, a support which is rotative relative to the stand and consisting of a ring supported by rollers, said ring carrying arms which are angularly spaced equal distances apart and extend radially relative to the axis of the ring, light beam projectors respectively fixed to the outer ends of the arms, a driving device so arranged as to drive the ring in rotation while leaving the central part of the ring open, and means for supplying power to the projectors.

Further features and advantages of the invention will be apparent from the ensuing description, with reference to the accompanying drawings to which the invention is in no way limited.

In the drawings:
FIG. 1 is a diagrammatic side elevational view of a filming unit according to the invention;
FIG. 2 is a simplified front elevational view of the rotary illuminating device employed in said unit, a single one of the four light beam projectors being shown, and
FIG. 3 is a sectional view, on an enlarged scale, of a detail of the device.

In the embodiment shown in FIG. 1, the filming unit comprises a picture 1 fixed to a vertical wall P, for example single-colour wall, and a camera 2 which is shown diagrammatically and is of any conventional type. The filming zone is therefore defined by a cone having a horizontal axis and an apex O which is the optical centre of the camera and the base of the cone being defined by the periphery of the image to be filmed which is usually the whole of the picture 1. The vertical section of the filming zone is therefore in this case represented by the straight lines OA, OB.

Disposed between the picture 1 and the camera 2 is an illuminating device 3 comprising a stand 4 supporting a vertical chassis consisting of uprights 5 and a cross-member 6, a support frame 7 on which are secured brackets 8 on which are rotatably mounted three rollers $9^a$, $9^b$, $9^c$, these rollers serving to support an annular rotary assembly 10. For this purpose, each of the rollers can be mounted as shown in FIG. 3 by means of a pin 11 which is screwthreaded at both ends, includes an enlarged portion $11^a$, and is secured on the corresponding bracket 8 by means of a nut 12. The roller is mounted on the pin by a ball-bearing 13 held in position by a resilient split ring 14 and a nut 15. The pins 11 of the upper rollers $9^a$, $9^b$ can be rectilinear as shown in FIG. 3, but the lower roller $9^c$ is preferably mounted on a pin whose end is eccentric so that the position of this third roller $9^c$ relative to the two fixed rollers can be adjusted by the rotation of its pin.

The annular rotary assembly 10 carried by the rollers comprises a steel ring 16 and two annular members 17, 18 of copper or other electrically conductive metal. The three elements 16, 17, 18 are assembled by bolts, such as 19 spaced an equal distance apart and these elements are spaced apart and insulated from each other by means of insulating washers 20 and an insulating sleeve 21. The assembly is held together by a nut 22. The ring 16 comprises an inner portion $16^a$ of such axial extent as to suit the axial extent or width of the groove 9A of the rollers and bears on these three rollers in such manner as to be freely rotative about its axis while rolling on these rollers. This ring has on its outer periphery a V-section groove 23 adapted to receive a V-belt 24 (FIGS. 1, 2 and 3) which extends round a drive pulley 25 driven by an electric motor 26. The latter is of such type that its speed can be easily adjusted and the device includes an adjusting means 27 for adjusting said speed. For example, the motor 26 is a universal motor and the means 27 is a transformer having an adjustable power take off which permits varying the supply voltage applied to the terminals of this motor. The assembly 25, 26, 27 is carried by the cross-member 6.

The rotary ring 16 carries a plurality of supports 28 (four in the presently-described embodiment) on which are secured respectively four radial arms 29 only one of which is shown in the drawings. These arms 29 each carry a high power light beam projector 30, for example of 500 watts, which is so directed that when the device is placed in front of the picture with the ring disposed and directed in such manner that its axis OX intersects the centre of the picture, the axes of the light beam projectors also intersect the centre of the picture. For this purpose, each of the projectors can be mounted on its arm 29 by means of a pivotal mounting 31 which permits a pivotal adjustment of the inclination of the projector, the angular position of the latter being for example maintained by any clamping means (not shown).

Each of the projectors is electrically connected by two conductors, such as 32, 33 to the two members or slip-rings 17, 18 respectively. The connection between the conductors and the slip-rings can be obtained by soldering; preferably each conductor is detachably connected to its slip-ring by means of a plug secured to the end of this conductor, this plug being fitted into a socket secured to the corresponding slip-ring. One of these sockets extends through the steel ring 16 and is insulated from the latter by an insulating sleeve 34 and the other socket extends through the steel ring 16 and the annular member 17 and is insulated from the steel ring and this annular member by an insulating sleeve 35 of suitable length.

The four projectors can therefore be separately connected at four points of the annular members by four pairs of sockets and plugs. The projectors can also be connected in parallel and connected to the annular members by means of a single pair of plugs and sockets.

The current is supplied to the conductive slip-rings 17, 18 by sliding contacts constituted by two fixed brushes 36, 37 mounted on brush supports 38, 39, which are secured to the chassis by a mounting member 40 and insulated from the latter and from each other by any suitable means. In the drawings, these two brush supports are shown in the same radial plane of the annular members 17, 18 and both secured to the same mounting member 40. It will be understood that these two brush supports can be mounted in two different radial planes on individual supports secured in any position with respect to the annular members. In FIG. 2 these brush supports are shown disposed in the upper part of the annular members between two of the rollers: in FIG. 3 for reasons of clarity the two brush supports are shown in the radial plane of a roller. In practice, it is preferable to mount the brushes on two different supports contained in the radial planes of two rollers.

Each of the brush supports is connected by a conductor 41 or 42 respectively to one of the terminals of an appropriate source of current. It will be understood that the two conductors 41, 42 can be connected to the input terminals of the transformer 27 so that the connection of these conductors supplies current to all the electric parts of the device.

The operation of this unit will be obvious from the foregoing description. The camera mounted on any support (not shown) is disposed axially in front of the picture 1 and the device 3 is disposed between the picture and the camera and suitably centered on the common axis of the camera and picture in such position that none of the light rays emitted from the different points of the periphery of the picture toward the centre O is intersected by the device. The inclination of the light beam projectors is suitably adjusted so that the axes of the light beams emitted by these projectors approximately intersect the centre of the picture. In acting on the transformer 27 the assembly is progressively started up and the picture is brightly illuminated by the rotating light beams so that there is obtained an illusion of animation of the image engraved on the picture 1, the simulated speeds of the elements illustrated in the picture being a function of the speed of rotation of the illuminating device. As this speed is so adjusted as to obtain a suitable representation on the picture, the animated image of the picture can then be filmed by the camera without taking any other precaution, the rotating lighting afforded by this device providing a high-intensity illumination enabling very good films to be taken without the illuminating device hindering in any way this filming.

The driving device can be provided with a reversing means so that it would be possible to reverse the direction of rotation of the light beams if desired and consequently the direction of the simulated movements of the elements of the picture.

The belt driving device for driving the ring can be replaced by any appropriate transmission device, such as a cable, friction roller or a gear transmission.

The axis OX is not necessarily horizontal. In particular the device 3 can be so arranged that this axis is vertical.

Having now described my invention what I claim as new and desire to secure by Letters Patent is:

1. A rotary illuminating device of utility in a unit for filming a picture which has a surface including projections and gives an illusion of movement when illuminated by a moving light source, said device comprising a stand, a support which is rotative relative to the stand and consisting of a ring, rollers rotatably mounted on the stand and supporting said ring, said ring carrying arms which are angularly spaced equal distances apart and extend radially relative to the axis of the ring, light beam projectors respectively fixed to the outer ends of the arms, a driving device fixed on said support and driving the ring in rotation about its axis by applying a circumferential force thereto, and means for supplying power to the projectors.

2. A device as claimed in claim 1, wherein said driving device comprises a variable speed motor and a transmission means connecting the latter to the ring.

3. A device as claimed in claim 2, said ring comprising an outer peripheral groove and a belt or cable connects the grooving ring to a drive pulley driven by the motor.

4. A device as claimed in claim 2, wherein the transmission means comprise a friction roller engaging the ring and driven by the motor.

5. A rotary illuminating device of utility in a unit for filming a picture which has a surface including projections and gives an illusion of movement when illuminated by a moving light source, said device comprising a stand, a support which is rotative relative to the stand and consisting of a ring, rollers rotatably mounted on the stand and supporting said ring, said ring carrying arms which are angularly spaced equal distances apart and extend radially relative to the axis of the ring, light beam projectors respectively fixed to the outer ends of the arms, a driving device fixed on said support and driving the ring in rotation about its axis by applying a circumferential force thereto, and means for supplying power to the projectors, said means comprising two electrically conductive slip rings rigid with said ring and located in parallel planes coaxially with said ring and rotatable with said ring, and two brushes fixed relative to said stand and respectively in rubbing engagement with said slip-rings and intended to be connected to a source of current.

6. A device as claimed in claim 5, wherein the slip-rings have approximately the same inside diameter as said ring.

7. A device as claimed in claim 5, further comprising plug and socket means detachably connecting the projectors to the slip-rings.

8. A rotary illuminating device of utility in a unit for filming a picture which has a surface including projections and gives an illusion of movement when illuminated by a moving light source, said device comprising a stand, a support which is rotative relative to the stand and consisting of a ring, rollers rotatably mounted on the stand and rotatably engaging the inner edge of the ring and supporting said ring, said ring carrying arms which are angularly spaced equal distances apart and extend radially relative to the axis of the ring, light beam projectors respectively fixed to the outer ends of the arms, a driving device fixed on said support and driving the ring in rotation about its axis by applying a circumferential force thereto, and means for supplying power to the projectors.

9. A device as claimed in claim 8, wherein three of said rollers are provided, at least one of which rollers is adjustably mounted on the stand so that its position relative to the other rollers can be adjusted.

References Cited by the Examiner

UNITED STATES PATENTS 2,560,392  7/1951  Latrobe _____ 40—106.52
2,747,459  5/1956  Morrison _____ 240—1.3 X

FOREIGN PATENTS 8,087  1912  Great Britain.

JULIA E. COINER, Primary Examiner.

WILLIAM MISIEK, Examiner.